United States Patent
Lee et al.

(10) Patent No.: US 12,021,279 B2
(45) Date of Patent: Jun. 25, 2024

(54) HUMIDIFIER FOR FUEL CELL

(71) Applicants: Hyundai Motor Company, Seoul (KR); Kia Motors Corporation, Seoul (KR)

(72) Inventors: Ju Yong Lee, Gyeonggi-do (KR); Won Sub Han, Seoul (KR); Hyun Yoo Kim, Seoul (KR)

(73) Assignees: Hyundai Motor Company, Seoul (KR); Kia Corporation, Seoul (KR)

(*) Notice: Subject to any disclaimer, the term of this patent is extended or adjusted under 35 U.S.C. 154(b) by 306 days.

(21) Appl. No.: 17/204,435

(22) Filed: Mar. 17, 2021

(65) Prior Publication Data
US 2022/0166038 A1    May 26, 2022

(30) Foreign Application Priority Data
Nov. 20, 2020    (KR) .......................... 10-2020-0157112

(51) Int. Cl.
*H01M 8/04119*    (2016.01)

(52) U.S. Cl.
CPC .................. *H01M 8/04149* (2013.01); *H01M 8/04141* (2013.01)

(58) Field of Classification Search
CPC .................. H01M 8/04082–04089; H01M 8/04119–04126; H01M 8/04149; H01M 8/04492–04529; H01M 8/04828–0485
See application file for complete search history.

(56) References Cited

U.S. PATENT DOCUMENTS

| 10,381,663 B2 | 8/2019 | Kim et al. |
| 2001/0015500 A1* | 8/2001 | Shimanuki ............... B01F 23/21 |
| | | 261/104 |
| 2005/0280166 A1* | 12/2005 | Katagiri ............ H01M 8/04149 |
| | | 261/75 |

(Continued)

FOREIGN PATENT DOCUMENTS

| KR | 101481176 B1 | 1/2015 |
| KR | 101675742 B1 | 11/2016 |

(Continued)

OTHER PUBLICATIONS

Machine translation of KR 2021-0144114. Originally available Nov. 30, 2021. (Year: 2021).*

(Continued)

*Primary Examiner* — Jonathan Crepeau
*Assistant Examiner* — Jacob Buchanan
(74) *Attorney, Agent, or Firm* — Fox Rothschild LLP (57) ABSTRACT

A humidifier for a fuel cell includes: a housing; a first space provided in the housing; a moist air supply port connected to the housing so as to communicate with the first space and configured to supply moist air discharged from a fuel cell stack; a humidification unit provided in the first space; a second space disposed separately from the first space and provided in the housing so as to communicate with the humidification unit; and an inflow gas discharge port connected to the housing so as to communicate with the second space and configured to discharge inflow gas that has passed through the humidification unit, which can simplify a structure of the humidifier and improve spatial utilization and a degree of design freedom.

10 Claims, 6 Drawing Sheets

(56) References Cited

U.S. PATENT DOCUMENTS

| | | | | |
|---|---|---|---|---|
| 2017/0077531 A1* | 3/2017 | Kim | ................. | B01F 23/20 |
| 2017/0149074 A1* | 5/2017 | Kim | ................. | H01M 8/04126 |
| 2018/0062187 A1* | 3/2018 | Kim | ................. | H01M 8/04149 |
| 2023/0163329 A1* | 5/2023 | Noh | ................. | H01M 8/04141 |
| | | | | 429/413 |

FOREIGN PATENT DOCUMENTS

| | | | | |
|---|---|---|---|---|
| KR | 10-2021-0142497 A | | 11/2021 | |
| KR | 20210144114 A | * | 11/2021 | ........ H01M 8/04149 |
| KR | 1020210142371 A | | 11/2021 | |
| KR | 102406331 B1 | * | 6/2022 | ........ H01M 8/04149 |

OTHER PUBLICATIONS

Machine translation of KR 102406331. Originally available Jun. 2, 2022. (Year: 2022).*

* cited by examiner

HUMIDIFIER FOR FUEL CELL

CROSS-REFERENCE TO RELATED APPLICATION

This application claims under 35 U.S.C. § 119(a) the benefit of Korean Patent Application No. 10-2020-0157112 filed in the Korean Intellectual Property Office on Nov. 20, 2020, the entire contents of which are incorporated herein by reference.

BACKGROUND

(a) Technical Field

The present disclosure relates to a humidifier for a fuel cell, more particularly, to the humidifier for the fuel cell, which is capable of having a simplified structure and improving spatial utilization and a degree of design freedom.

(b) Description of the Related Art

A fuel cell system refers to a system that continuously produces electrical energy by utilizing a chemical reaction of continuously supplied fuel. Research and development have been regularly performed on the fuel cell system as an alternative capable of solving global environmental issues.

Based on types of electrolytes used for the fuel cell system, the fuel cell system may be classified into a phosphoric acid fuel cell (PAFC), a molten carbonate fuel cell (MCFC), a solid oxide fuel cell (SOFC), a polymer electrolyte membrane fuel cell (PEMFC), an alkaline fuel cell (AFC), a direct methanol fuel cell (DMFC), and the like. Based on operating temperatures, output ranges, and the like as well as types of used fuel, the fuel cell systems may be applied to various application fields related to mobile power, transportation, distributed power generation, and the like.

Among different types of fuel cells, the polymer electrolyte membrane fuel cell is applied to the field of a hydrogen vehicle (hydrogen fuel cell vehicle) being developed to substitute for an internal combustion engine.

The hydrogen vehicle includes a fuel cell stack that produces electricity through an oxidation-reduction reaction between hydrogen and oxygen $O_2$. The hydrogen vehicle is configured to travel as a motor is operated by electricity produced by the fuel cell stack.

An electrolyte membrane of a membrane electrode assembly needs to be maintained at a predetermined humidity or higher in order to normally operate the fuel cell stack, and thus inflow gas may be humidified by a humidifier before being introduced into the fuel cell stack.

Recently, there has been proposed a method of humidifying inflow gas (dry air), which passes through the humidifier, by using moist air discharged from the fuel cell stack.

In addition, a hydrogen vehicle is provided with an air control valve configured to control air to be introduced into the fuel cell stack (air to be introduced into the fuel cell stack via the humidifier) and air to be discharged from the fuel cell stack (air to be discharged from the fuel cell stack to the humidifier).

Meanwhile, in order to improve spatial utilization and a degree of design freedom of the hydrogen vehicle, it is necessary to minimize a space (distance) between the fuel cell stack (e.g., a system frame on which the fuel cell stack is seated) and the humidifier.

However, in the related art, connection ports (including a port through which inflow gas is introduced, and a port through which moist air is discharged) of the air control valve are disposed in parallel (in parallel in the same direction), but ports (including an inflow gas discharge port through which the inflow gas is discharged, and a moist air supply port through which the moist air is introduced) of a dryer, which correspond to the connection ports of the air control valve, respectively, are disposed to intersect each other (e.g., in a cross shape without being disposed in parallel) unlike the connection ports. For this reason, there is a problem in that it is difficult to provide a straight tube to connect the air control valve and the humidifier, and a tube for connecting the air control valve and the humidifier is inevitably formed in a curved shape (e.g., an S shape).

Since the curved tube needs to be provided to connect the air control valve and the humidifier in the related art as described above, it is necessary to ensure a space (having a height that allows a curvature of the curved tube) that allows the curved tube to be disposed between the fuel cell stack and the humidifier. As a result, there is a problem in that it is difficult to reduce the distance between the fuel cell stack and the humidifier to a certain degree or more, and a degree of design freedom and spatial utilization deteriorate.

Moreover, since the tube for connecting the air control valve and the humidifier is formed in a curved shape in the related art, there is a problem in that a structure and a manufacturing process are complicated, there is a disadvantage in terms of costs, a differential pressure of the humidifier is increased due to the curvature of the tube, and energy efficiency deteriorates (electric power consumption increases).

In addition, in the related art, the humidifier needs to be mounted on the system frame by utilizing a separate bracket in order to ensure the distance between the fuel cell stack and the humidifier, which causes a problem in that manufacturing costs are increased and a weight is increased.

Therefore, recently, various types of research have been conducted to minimize the space between the fuel cell stack and the humidifier and improve spatial utilization and a degree of design freedom, but the results of this research result have been insufficient. Accordingly, there is a need for development of a humidifier for a fuel cell, which is capable of minimizing the space between the fuel cell stack and the humidifier and thus improving spatial utilization and a degree of design freedom.

SUMMARY

The present disclosure provides a humidifier for a fuel cell, which is capable of having a simplified structure and improving a degree of design freedom and spatial utilization.

The present disclosure also applies a straight tube as a tube for connecting a fuel cell stack and a humidifier and minimize a space between the humidifier and the fuel cell stack.

The present disclosure may simplify a manufacturing process and reduce costs.

The present disclosure may minimize a deterioration in energy efficiency caused by an increase in differential pressure of a humidifier, and thus improve humidification performance.

An exemplary embodiment of the present disclosure provides a humidifier for a fuel cell, the humidifier including: a housing; a first space provided in the housing; a moist air supply port connected to the housing so as to communicate with the first space and configured to supply moist air discharged from a fuel cell stack; a humidification unit provided in the first space; a second space disposed separately from the first space and provided in the housing so as to communicate with the humidification unit; and an inflow gas discharge port connected to the housing so as to communicate with the second space and configured to discharge inflow gas that has passed through the humidification unit.

This is to simplify a structure and improve a degree of design freedom and spatial utilization.

That is, in the related art, connection ports (including a port through which inflow gas is introduced, and a port through which moist air is discharged) of the air control valve are disposed in adjacent and parallel to each other, but ports (including an inflow gas discharge port through which the inflow gas is discharged, and a moist air supply port through which the moist air is introduced) of a dryer, which correspond to the connection ports of the air control valve, respectively, are disposed to intersect each other (without being disposed in parallel) unlike the connection ports. For this reason, there is a problem in that it is difficult to provide a straight tube to connect the air control valve and the humidifier, and a tube for connecting the air control valve and the humidifier is inevitably formed in a curved shape (e.g., an S shape).

Since the curved tube needs to be provided to connect the air control valve and the humidifier in the related art as described above, it is necessary to ensure a space (having a height that allows a curvature of the curved tube) that allows the curved tube to be disposed between the fuel cell stack and the humidifier. As a result, there is a problem in that it is difficult to reduce the distance between the fuel cell stack and the humidifier to a certain degree or more, and a degree of design freedom and spatial utilization deteriorate.

Moreover, since the tube for connecting the air control valve and the humidifier is formed in a curved shape in the related art, there is a problem in that a structure and a manufacturing process are complicated, there is a disadvantage in terms of costs, a differential pressure of the humidifier is increased due to the curvature of the tube, and energy efficiency deteriorates (electric power consumption increases).

In addition, in the related art, the humidifier needs to be mounted on the system frame by means of a separate bracket in order to ensure the distance between the fuel cell stack and the humidifier, which causes a problem in that manufacturing costs are increased and a weight is increased.

In contrast, in the exemplary embodiment of the present disclosure, the first space is provided to be stacked (to define another layer sealed independently) on the upper portion of the second space, and the inflow gas discharge port penetrates the first space in the state in which the inflow gas discharge port is sealed from the first space, such that the moist air supply port and the inflow gas discharge port may be disposed in parallel with each other in the direction perpendicular to the longitudinal direction of the housing. As a result, it is possible to obtain an advantageous effect of simplifying the connection structure between the fuel cell stack and the humidifier for a fuel cell and improving the degree of design freedom and the spatial utilization.

Among other things, in the exemplary embodiment of the present disclosure, like the connection ports of the air control valve, the moist air supply port and the inflow gas discharge port of the humidifier for a fuel cell may be formed in parallel with each other, and as a result, the first and second straight tubes each having a straight shape may be applied as the tubes for connecting the air control valve and the humidifier.

Therefore, in the exemplary embodiment of the present disclosure, the space in which the first straight tube and the second straight tube are disposed between the fuel cell stack and the humidifier may be minimized, and as a result, it is possible to obtain an advantageous effect of minimizing the distance between the fuel cell stack and the humidifier and improving the degree of design freedom and the spatial utilization.

The shape and the structure of the housing may be variously changed in accordance with required conditions and design specifications.

For example, the housing may include: a housing main body; a first housing cap connected to a first end of the housing main body; and a second housing cap connected to a second end of the housing main body and having the moist air supply port and the inflow gas discharge port.

According to the exemplary embodiment of the present disclosure, the humidifier for a fuel cell may include an inflow gas supply port provided in the first housing cap so as to communicate with the humidification unit.

According to the exemplary embodiment of the present disclosure, the humidifier for a fuel cell may further include a moist air discharge port connected to the housing so as to communicate with the first space and configured to discharge the moist air.

The division (sealed) structure between the first space and the second space may be variously changed in accordance with required conditions and design specifications.

For example, the humidifier for a fuel cell may include a partition part configured to divide an internal space of the housing into a first space and a second space.

In particular, a first end of the inflow gas discharge port may be exposed to the outside of the housing, and a second end of the inflow gas discharge port may be connected to the partition part so as to pass through the first space and may communicate with the second space.

According to the exemplary embodiment of the present disclosure, the partition part may include: a first partition wall configured to divide the internal space of the housing in a first direction; and a second partition wall connected to the first partition wall and configured to divide the internal space of the housing in a second direction that intersects the first direction, and the second space may be separated from the first space by the first partition wall and the second partition wall.

According to the exemplary embodiment of the present disclosure, the first space may include: a first stage space portion separated from the second space with the first partition wall interposed therebetween; and a second stage space portion configured to communicate with the first stage space portion and separated from the second space with the second partition wall interposed therebetween.

In particular, the humidification unit may be provided in the first stage space portion, and the moist air may be supplied to the first stage space portion via the second stage space portion.

The humidification unit may have various structures capable of humidifying the inflow gas by using the moist air.

For example, the humidification unit may include: a cartridge casing provided in the housing, the cartridge casing having, at a first side thereof, a first window through which the moist air is introduced, and the cartridge casing having, at a second side thereof, a second window through which the moist air is discharged; and a humidification membrane provided in the cartridge casing and configured to allow the inflow gas to flow along the humidification membrane.

In particular, the first partition wall may be made of a potting material for fixing the humidification membrane in the housing. Since the first partition wall serves not only to separate the first space and the second space but also to fix the humidification membrane as described above, it is possible to obtain an advantageous effect of simplifying the structure and improving the spatial utilization and the degree of design freedom.

According to the exemplary embodiment of the present disclosure, the inflow gas discharge port may be connected to the second partition wall so as to pass through the second stage space portion, and the moist air supply port may be connected to the housing so as to face the second partition wall.

Particularly, the moist air supply port and the inflow gas discharge port may be disposed in a direction perpendicular to a longitudinal direction of the housing.

According to the exemplary embodiment of the present disclosure, the humidifier for a fuel cell may include a first straight tube configured to connect the fuel cell stack and the moist air supply port, and a second straight tube configured to connect the fuel cell stack and the inflow gas discharge port.

In particular, the first straight tube and the second straight tube may be connected to an air control valve mounted on the fuel cell stack.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinafter, exemplary embodiments of the present disclosure will be described in detail with reference to the accompanying drawings.

However, the technical spirit of the present disclosure is not limited to some exemplary embodiments described herein but may be implemented in various different forms. One or more of the constituent elements in the exemplary embodiments may be selectively combined and substituted within the scope of the technical spirit of the present disclosure.

In addition, unless otherwise specifically and explicitly defined and stated, the terms (including technical and scientific terms) used in the exemplary embodiments of the present disclosure may be construed as the meaning which may be commonly understood by the person with ordinary skill in the art to which the present disclosure pertains. The meanings of the commonly used terms such as the terms defined in dictionaries may be interpreted in consideration of the contextual meanings of the related technology.

In addition, the terms used in the exemplary embodiment of the present disclosure are for explaining the exemplary embodiments, not for limiting the present disclosure.

Unless particularly stated otherwise in the context of the present specification, a singular form may also include a plural form. The explanation "at least one (or one or more) of A, B, and C" described herein may include one or more of all combinations that can be made by combining A, B, and C.

In addition, the terms such as first, second, A, B, (a), and (b) may be used to describe constituent elements of the exemplary embodiments of the present disclosure.

These terms are used only for the purpose of discriminating one constituent element from another constituent element, and the nature, the sequences, or the orders of the constituent elements are not limited by the terms.

Further, when one constituent element is described as being 'connected', 'coupled', or 'attached' to another constituent element, one constituent element can be connected, coupled, or attached directly to another constituent element or connected, coupled, or attached to another constituent element through still another constituent element interposed therebetween.

In addition, the explanation "one constituent element is formed or disposed above (on) or below (under) another constituent element" includes not only a case in which the two constituent elements are in direct contact with each other, but also a case in which one or more additional constituent elements are formed or disposed between the two constituent elements. In addition, the expression "up (above) or down (below)" may include a meaning of a downward direction as well as an upward direction based on one constituent element.

Referring to FIGS. 1 to 6, a humidifier 100 for a fuel cell according to the present disclosure includes: a housing 110; a first space 120 provided in the housing 110; a moist air supply port 112 connected to the housing 110 so as to communicate with the first space 120 and configured to supply moist air WG discharged from a fuel cell stack 20; a humidification unit 150 provided in the first space 120; a second space 130 disposed separately from the first space 120 and provided in the housing 110 so as to communicate with the humidification unit 150; and an inflow gas discharge port 118 connected to the housing 110 so as to communicate with the second space 130 and configured to discharge inflow gas DG that has passed through the humidification unit 150.

The humidifier 100 according to the present disclosure is provided to humidify the inflow gas DG (e.g., air) to be introduced into the fuel cell stack 20 (e.g., the fuel cell stack mounted in a fuel cell vehicle).

For reference, the fuel cell stack 20 may have various structures capable of producing electricity by utilizing an oxidation-reduction reaction between fuel (e.g., hydrogen) and an oxidant (e.g., air).

As an example, the fuel cell stack 20 includes: a membrane electrode assembly (MEA) (not illustrated) having catalyst electrode layers, in which electrochemical reactions occur, at both sides of an electrolyte membrane through which hydrogen ions move; gas diffusion layers (GDLs) (not illustrated) configured to uniformly distribute reactant gases and serve to transfer generated electrical energy; a gasket (not illustrated) and a fastener (not illustrated) configured to maintain leakproof sealability for the reactant gases and a coolant and maintain an appropriate fastening pressure; and separators (bipolar plates) (not illustrated) configured to move the reactant gases and the coolant.

In particular, in the fuel cell stack 20, hydrogen, which is fuel, and air (oxygen), which is an oxidant, are supplied to an anode and a cathode of the membrane electrode assembly, respectively, through flow paths in the separators, such that the hydrogen is supplied to the anode, and the air is supplied to the cathode.

The hydrogen supplied to the anode is separated into hydrogen ions (protons) and electrons by catalysts in the electrode layers provided at both sides of the electrolyte membrane. Only the hydrogen ions are selectively transmitted to the cathode through the electrolyte membrane, which is a cation exchange membrane, and at the same time, the electrons are transmitted to the cathode through the gas diffusion layer and the separator which are conductors.

At the cathode, the hydrogen ions supplied through the electrolyte membrane and the electrons delivered through the separator meet oxygen in the air supplied to the cathode by an air supply device, thereby creating a reaction of producing water. As a result of the movement of the hydrogen ions, the electrons flow through external conductive wires, and an electric current is produced as a result of the flow of the electrons.

The housing 110 is provided to have a predetermined receiving space therein.

The housing 110 may be variously changed in shape and structure in accordance with required conditions and design specifications, and the present disclosure is not restricted or limited by the shape and the structure of the housing 110.

For example, the housing 110 may include a housing main body 110a, a first housing cap 110b connected to a first end of the housing main body 110a, and a second housing cap 110c connected to a second end of the housing main body 110a.

For example, the housing main body 110a may be formed in a quadrangular box shape having the receiving space therein, the first housing cap 110b may be connected to a right end (based on FIG. 2) of the housing main body 110a, and the second housing cap 110c may be connected to a left end (based on FIG. 2) of the housing main body 110a.

According to another exemplary embodiment of the present disclosure, the first housing cap and the second housing cap may be provided at an upper end or a lower end of the housing main body.

The first housing cap 110b may be provided with an inflow gas supply port 116 through which the inflow gas DG is introduced (supplied). The second housing cap 110c may be provided with the moist air supply port 112 through which the moist air WG discharged from the fuel cell stack 20 is supplied, and the inflow gas discharge port 118 through which the inflow gas DG passing through the humidification unit 150 is discharged. The housing main body 110a may be provided with a moist air discharge port 114 formed to communicate with the first space 120.

Figure 6:
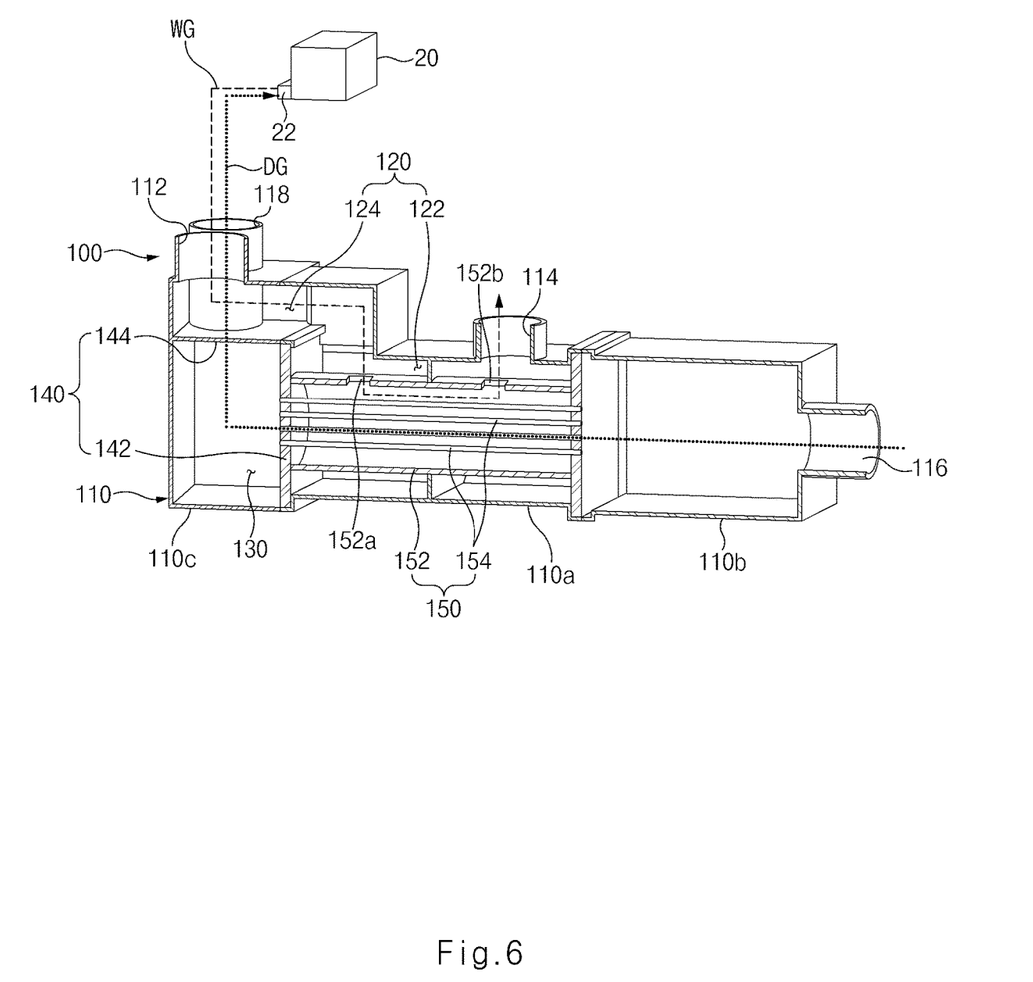
FIG. 6 is a view for explaining flows of inflow gas and moist air in the humidifier for a fuel cell according to the exemplary embodiment of the present disclosure.

For reference, referring to FIG. 6, the inflow gas DG, which is supplied through the inflow gas supply port 116 of the first housing cap 110b, may be humidified by the moist air WG while passing through the humidification unit 150 disposed in the first space 120 provided in the housing main body 110a. The inflow gas DG (e.g., humidified air), which is discharged through the inflow gas discharge port 118 of the second housing cap 110c, may be supplied to the fuel cell stack 20.

Further, the moist air WG (or produced water), which is discharged from the fuel cell stack 20, may be supplied into the moist air supply port 112 of the second housing cap 110c to humidify the inflow gas DG in the first space 120 and then discharged to the outside of the humidifier 100 through the moist air discharge port 114.

The housing 110 has therein the first space 120 and the second space 130 sealed independently.

For reference, in the exemplary embodiment of the present disclosure, the first space 120 may be defined as a space in which the moist air WG discharged from the fuel cell stack 20 flows, that is, a space or region in which the humidification unit 150 is disposed.

In addition, in the exemplary embodiment of the present disclosure, the second space 130 may be defined as a space sealed independently of the first space 120 and provided in the housing 110 so as to communicate with the humidification unit 150 and allow the humidified inflow gas DG to flow therethrough.

The division (sealed) structure between the first space 120 and the second space 130 may be variously changed in accordance with required conditions and design specifications.

Figure 1:
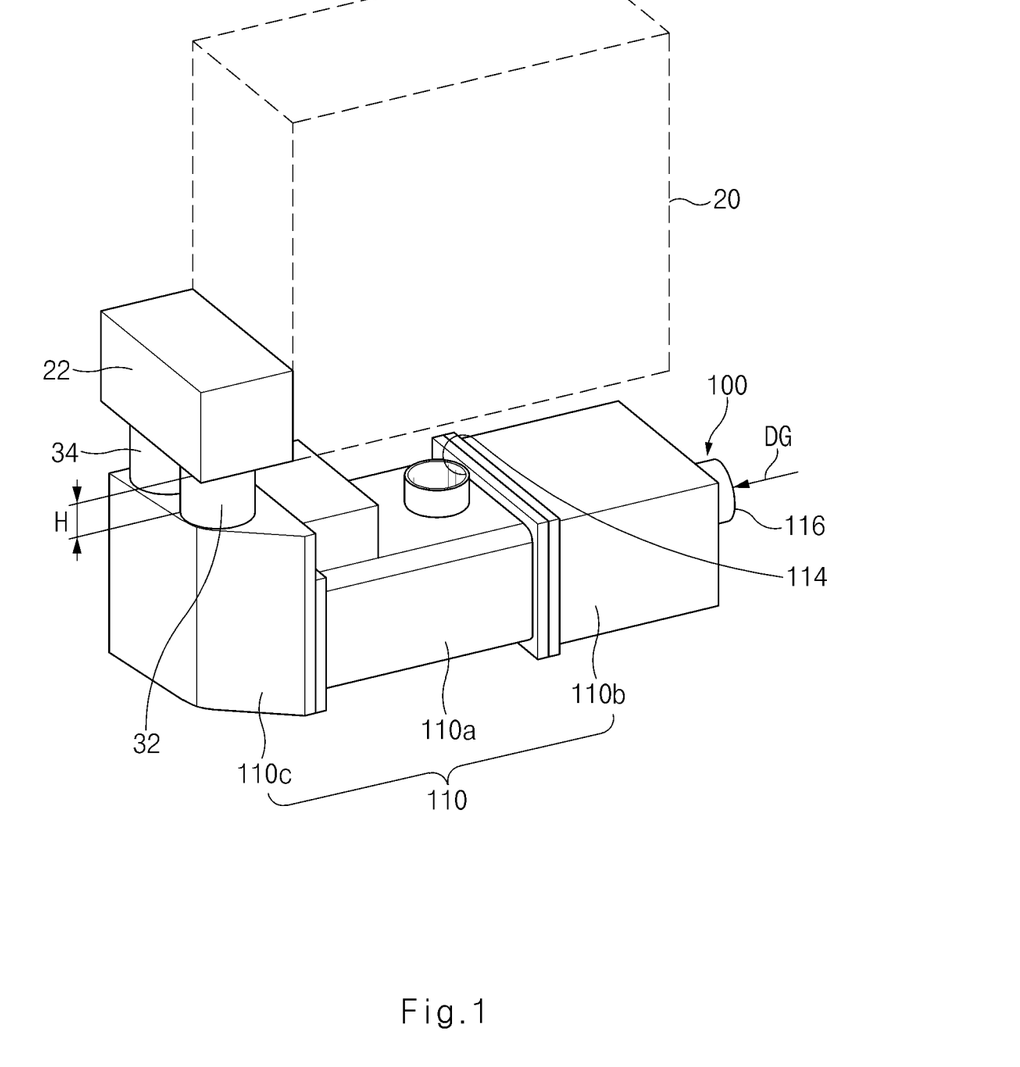
FIG. 1 is a perspective view for explaining a humidifier for a fuel cell according to an exemplary embodiment of the present disclosure.
Figure 2:
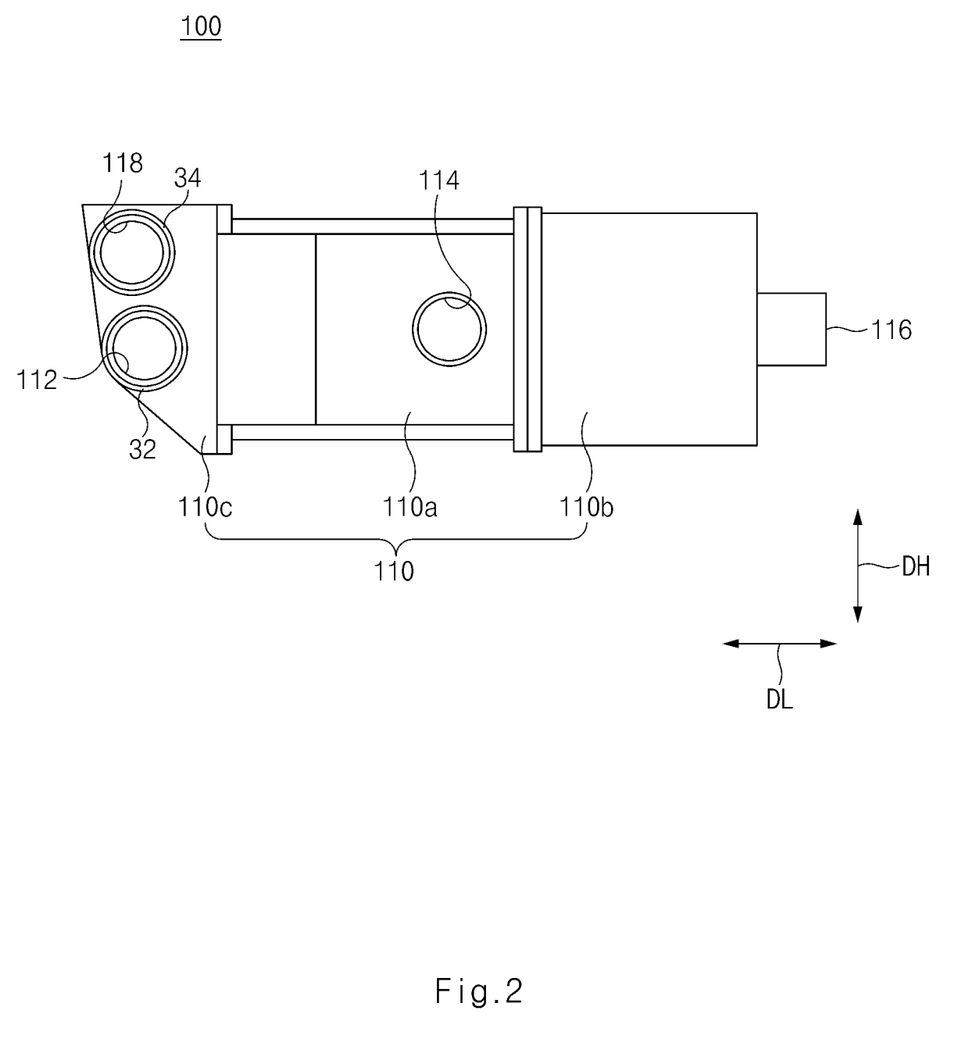
FIG. 2 is a top plan view for explaining the humidifier for a fuel cell according to the exemplary embodiment of the present disclosure.
Figure 3:
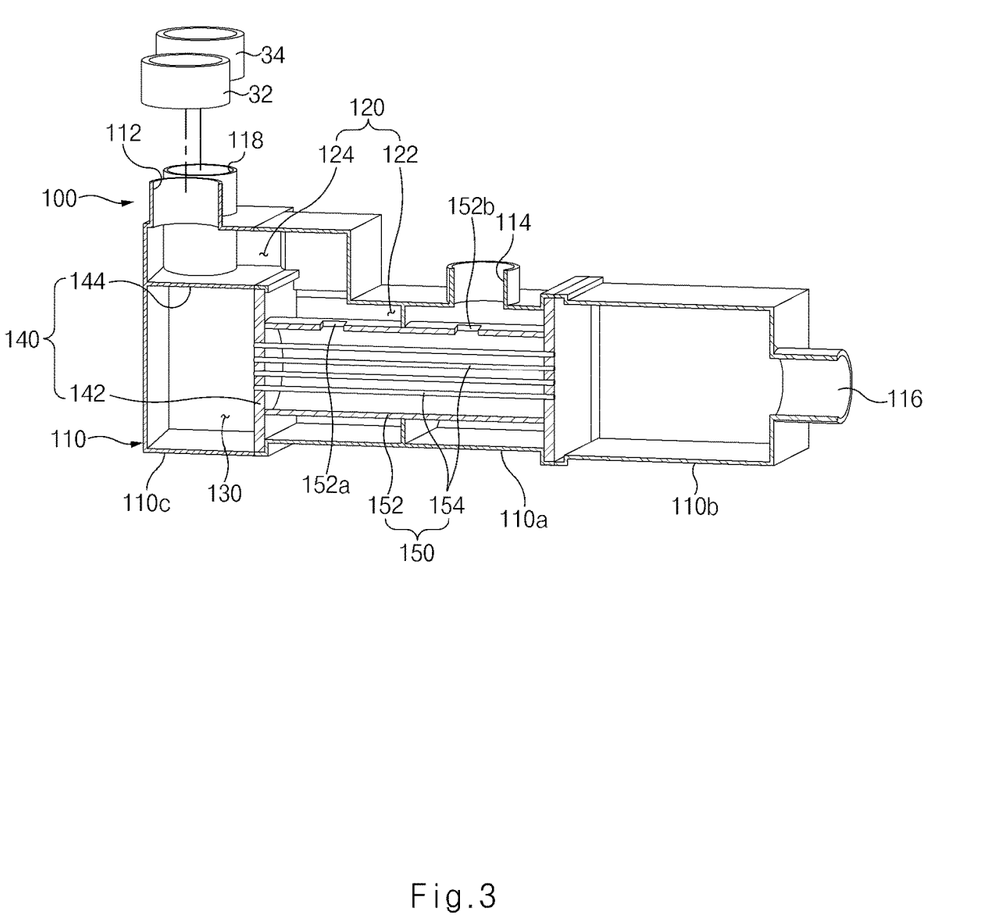
FIG. 3 is a cross-sectional view for explaining the humidifier for a fuel cell according to the exemplary embodiment of the present disclosure.
Figure 4:
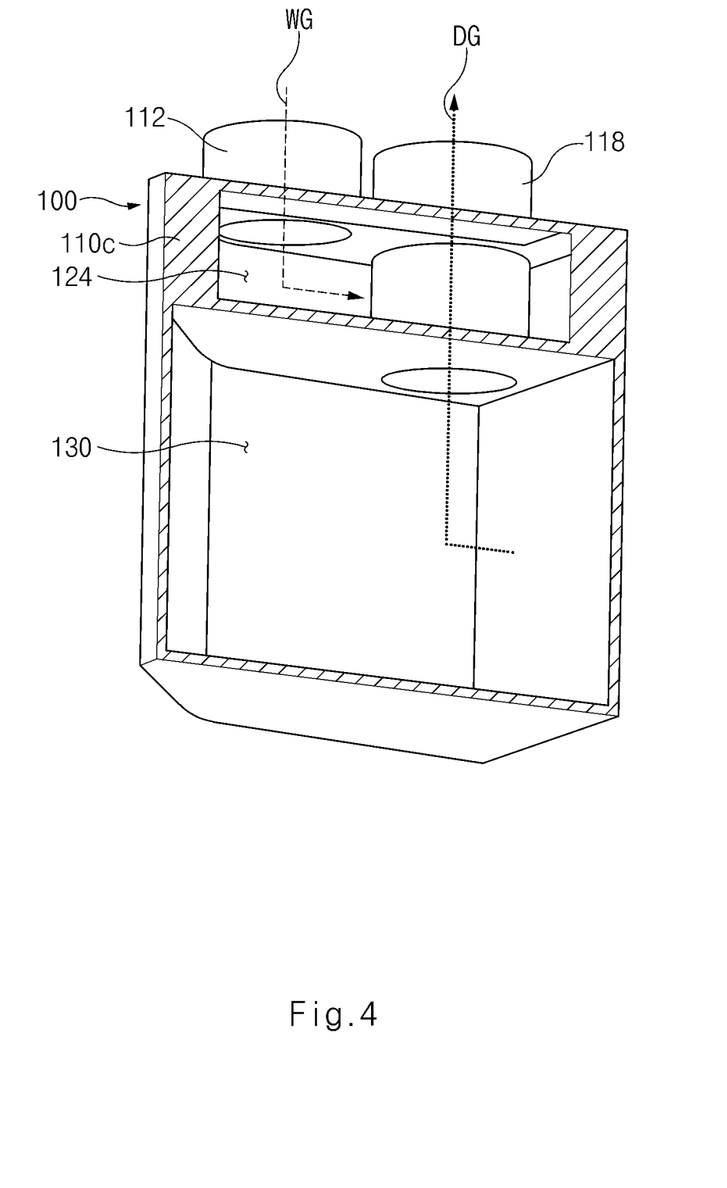
FIGS. 4 and 5 are views for explaining a first space and a second space in the humidifier for a fuel cell according to the exemplary embodiment of the present disclosure.
Figure 5:
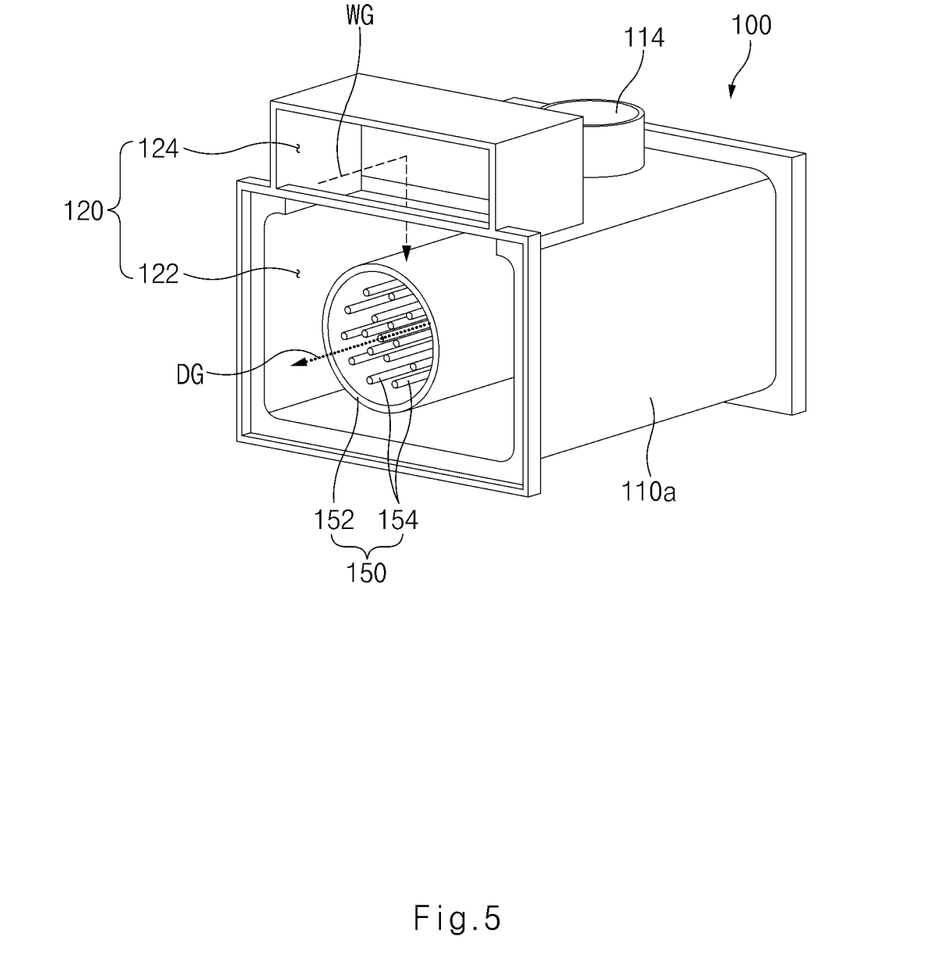

For example, referring to FIGS. 3 to 5, the humidifier 100 for a fuel cell may include a partition part 140 that divides an internal space of the housing 110 into the first space 120 and the second space 130.

The partition part 140 may have various structures capable of dividing the internal space of the housing 110 into the first space 120 and the second space 130, and the present disclosure is not limited or restricted by the structure of the partition part 140.

According to the exemplary embodiment of the present disclosure, the partition part 140 may include a first partition wall 142 configured to divide the internal space of the housing 110 in a first direction (e.g., vertical direction), and a second partition wall 144 connected to the first partition wall 142 and configured to divide the internal space of the housing 110 in a second direction (e.g., horizontal direction) that intersects the first direction, thereby forming an approximately " " shape. The second space 130 may be separated from the first space 120 (separated from the first space by the first partition wall and the second partition wall) with the first and second partition walls 142 and 144 interposed between the first space 120 and the second space 130.

According to another exemplary embodiment of the present disclosure, the second partition wall may be disposed to be inclined with respect to the horizontal direction, or the first partition wall may be disposed to be inclined with respect to the vertical direction.

The first space 120 may have various structures in accordance with required conditions and design specifications, and the present disclosure is not limited or restricted by the structure of the first space 120.

For example, the first space 120 may include a first stage space portion 122 separated from the second space 130 with the first partition wall 142 interposed therebetween, and a second stage space portion 124 configured to communicate with the first stage space portion 122 and separated from the second space 130 with the second partition wall 144 interposed therebetween.

According to the exemplary embodiment of the present disclosure, the moist air WG may be supplied to the first stage space portion 122 via the second stage space portion 124.

In this case, the configuration in which the moist air WG is supplied to the first stage space portion 122 via the second stage space portion 124 may be understood as a configuration in which the moist air WG supplied through the moist air supply port is introduced into the second stage space portion 124 first and then moved from the second stage space portion 124 to the first stage space portion 122.

The humidification unit 150 is provided in the first space 120 to humidify the inflow gas DG by using the moist air WG supplied into the housing 110.

According to the exemplary embodiment of the present disclosure, the humidification unit 150 may be provided in the first stage space portion 122 of the first space 120. According to another exemplary embodiment of the present disclosure, the humidification unit (or a part of the humidification unit) may be provided in the second stage space portion of the first space.

The humidification unit 150 may have various structures capable of humidifying the inflow gas DG by using the moist air WG, and the present disclosure is not limited or restricted by the structure of the humidification unit 150.

For example, the humidification unit 150 may include: a cartridge casing 152 provided in the housing 110, the cartridge casing 152 having, at a first side thereof, a first window 152a through which the moist air WG is introduced, and the cartridge casing 152 having, at a second side thereof, a second window 152b through which the moist air WG is discharged; and humidification membranes 154 provided in the cartridge casing 152 and configured to allow the inflow gas DG to flow along the humidification membranes 154.

The cartridge casing 152 may have various structures having therein a receiving space, and the present disclosure is not limited or restricted by the structure of the cartridge casing 152.

For reference, the number of cartridge casings 152 and the arrangement of the cartridge casing 152 may be variously changed in accordance with required conditions and design specifications. For example, only one cartridge casing 152 may be provided in the housing 110. According to another exemplary embodiment of the present disclosure, a plurality of cartridge casings may be provided in the housing.

In particular, the first window 152a through which the moist air WG is introduced is formed at the first side of the cartridge casing 152 (at a left portion of the cartridge casing based on FIG. 3), and the second window 152b through which the moist air WG is discharged is formed at the second side of the cartridge casing 152 (at a right portion of the cartridge casing based on FIG. 3).

The number of first and second windows 152a and 152b and the structures of the first and second windows 152a and 152b may be variously changed in accordance with required conditions and design specifications, and the present disclosure is not restricted or limited by the number of first and second windows 152a and 152b and the structures of the first and second windows 152a and 152b. For example, the plurality of first windows 152a and the plurality of second windows 152b may be formed in the cartridge casing 152 and each may be formed in the form of an approximately quadrangular hole.

According to another exemplary embodiment of the present disclosure, the first and second windows each may be formed in the form of a circular hole or may be formed in other shapes. Alternatively, the single first window and the single second window may be formed in the cartridge casing.

The humidification membranes 154 are provided in the cartridge casing 152 and configured such that the inflow gas DG flows along the inside of the humidification membranes 154.

For example, the humidification membrane 154 is formed as a tubular hollow fiber membrane in which the inflow gas DG may flow, and one end (inlet end) and the other end (outlet end) of the humidification membrane 154 may be fixed in the cartridge casing 152 by a potting material (corresponding to the first partition wall).

In particular, the first partition wall 142 may be made of a potting material for fixing the humidification membrane 154 in the housing 110. Since the first partition wall 142 serves not only to separate the first space 120 and the second space 130 but also to fix the humidification membrane 154 as described above, it is possible to obtain an advantageous effect of simplifying the structure and improving the spatial utilization and the degree of design freedom.

For reference, since the humidification membrane 154 is formed as a hollow fiber membrane, the moisture (e.g., the moisture in the moist air WG) supplied into the cartridge casing 152 may penetrate into the humidification membrane 154 from the outside of the humidification membrane 154 and then be transferred to the inflow gas DG. However, the inflow gas DG cannot penetrate the humidification membrane 154 from the inside of the humidification membrane 154 to the outside of the humidification membrane 154.

With the above-mentioned configuration, the moist air WG, which is supplied into the first space 120 through the moist air supply port 112, may be supplied into the cartridge casing 152 through the first window 152a, and the moist air WG supplied into the cartridge casing 152 may flow around the humidification membrane 154 and humidify the inflow gas DG flowing along the humidification membrane 154. Thereafter, the moist air WG, which is discharged to the outside of the cartridge casing 152 through the second windows 152b, may be discharged to the outside of the housing 110 through the moist air discharge port 114.

For reference, in the exemplary embodiment of the present disclosure described and illustrated above, the example in which the cartridge casing 152 is provided in the first space 120 and the humidification membrane 154 is disposed in the cartridge casing 152 has been described. However, according to another exemplary embodiment of the present disclosure, the humidification membrane may be directly disposed in the first space without separately providing the cartridge casing.

The moist air supply port 112 is provided to supply the moist air WG, which is discharged from the fuel cell stack 20, into the housing 110.

In particular, the moist air supply port 112 is connected to the housing 110 so as to communicate with the first space 120 (e.g., an upper portion of the first space based on FIG. 3), and the moist air WG discharged from the fuel cell stack 20 may be supplied into the second stage space portion 124 of the first space 120 along the moist air supply port 112.

According to the exemplary embodiment of the present disclosure, the moist air supply port 112 may be connected to the housing 110 (e.g., an upper surface of the housing based on FIG. 3) so as to face the second partition wall 144.

The inflow gas discharge port 118 is provided to discharge the inflow gas DG in the second space 130 (humidified air humidified while passing through the humidification unit) to the fuel cell stack 20.

In particular, the inflow gas discharge port 118 is connected to the housing 110 so as to communicate with the second space 130 and disposed in parallel with the moist air supply port 112, and the inflow gas DG passing through the humidification unit 150 may be discharged to the fuel cell stack 20 through the inflow gas discharge port 118.

In particular, one end (e.g., an upper end) of the inflow gas discharge port 118 is exposed to the outside of the housing 110, and the other end (e.g., a lower end) of the inflow gas discharge port 118 is connected to the partition part 140 (e.g., the first partition wall) so as to pass through the first space 120 (e.g., the second stage space portion of the first space) and communicates with the second space 130.

More particularly, the moist air supply port 112 and the inflow gas discharge port 118 may be disposed in parallel with each other in a direction DH perpendicular to a longitudinal direction DL of the housing 110.

According to the exemplary embodiment of the present disclosure, the humidifier 100 for a fuel cell may include a first straight tube 32 configured to connect the fuel cell stack 20 and the moist air supply port 112, and a second straight tube 34 configured to connect the fuel cell stack 20 and the inflow gas discharge port 118.

In this case, the first straight tube 32 and the second straight tube 34 may be defined as tubes formed straight without having a bent portion, and the present disclosure is not limited or restricted by the cross-sectional shape and the size of the tube.

In particular, the first straight tube 32 and the second straight tube 34 may be connected to connection ports (including a port through which the inflow gas DG is introduced, and a port through which the moist air WG is discharged) of an air control valve 22 mounted on the fuel cell stack 20.

For reference, the air control valve 22 may be provided to control the air (inflow gas DG) to be introduced into the fuel cell stack 20 and the air (moist air WG) to be discharged from the fuel cell stack 20. The port (not illustrated) through which the inflow gas DG is introduced and the port (not illustrated) through which the moist air WG is discharged may be formed in the air control valve 22 so as to be adjacent and parallel to each other (formed in parallel with each other in the direction DH in FIG. 2).

For example, a valve member (not illustrated) of the air control valve 22 may operate to open an air flow path (not illustrated) of the air control valve 22 when the vehicle operates. Further, the valve member of the air control valve 22 may operate to block the air flow path when the vehicle does not operate.

As described above, in the exemplary embodiment of the present disclosure, the first space 120 (the space into which the moist air is supplied) is provided to be stacked (to define another layer sealed independently) on the upper portion of the second space 130 (the space from which the inflow gas is discharged), and the inflow gas discharge port 118 penetrates the first space 120 in the state in which the inflow gas discharge port 118 is sealed from the first space 120, such that the moist air supply port 112 and the inflow gas discharge port 118 may be disposed in parallel with each other in the direction DH perpendicular to the longitudinal direction DL of the housing 110. As a result, it is possible to obtain an advantageous effect of simplifying the connection structure between the fuel cell stack 20 and the humidifier 100 for a fuel cell and improving the degree of design freedom and the spatial utilization.

That is, in the related art, the connection ports (including the port through which inflow gas DG is introduced, and the port through which moist air WG is discharged) of the air control valve are disposed to be adjacent and parallel to each other, but ports (including an inflow gas discharge port through which the inflow gas DG is discharged, and a moist air supply port through which the moist air WG is introduced) of a dryer, which correspond to the connection ports of the air control valve, respectively, are disposed to intersect each other (without being disposed in parallel) unlike the connection ports. For this reason, there is a problem in that it is difficult to provide a straight tube to connect the air control valve and the humidifier, and a tube for connecting the air control valve and the humidifier is inevitably formed in a curved shape (e.g., an S shape).

Since the curved tube needs to be provided to connect the air control valve 22 and the humidifier 100 in the related art as described above, it is necessary to ensure a space (having a height that allows a curvature of the curved tube) that allows the curved tube to be disposed between the fuel cell stack 20 and the humidifier 100. As a result, there is a problem in that it is difficult to reduce the distance between the fuel cell stack 20 and the humidifier 100 to a certain degree or more, and a degree of design freedom and spatial utilization deteriorate.

In contrast, in the exemplary embodiment of the present disclosure, like the connection ports of the air control valve 22, the moist air supply port 112 and the inflow gas discharge port 118 of the humidifier 100 for a fuel cell may be formed in parallel with each other, and as a result, the first and second straight tubes 32 and 34 each having a straight shape may be applied as the tubes for connecting the air control valve 22 and the humidifier 100.

Therefore, in the exemplary embodiment of the present disclosure, the space in which the first straight tube 32 and the second straight tube 34 are disposed between the fuel cell stack 20 and the humidifier 100 may be minimized, and as a result, it is possible to obtain an advantageous effect of minimizing the distance (see H in FIG. 1) between the fuel cell stack 20 and the humidifier 100 and improving the degree of design freedom and the spatial utilization.

In addition, according to the exemplary embodiment of the present disclosure, the first straight tube 32 and the second straight tube 34 may be applied as the tubes for connecting the fuel cell stack 20 (the air control valve) and the humidifier 100, and as a result, it is possible to obtain an advantageous effect of simplifying a structure of the tube, simplifying a process of manufacturing the tube, reducing costs, and minimizing differential pressure of the humidifier 100 caused by structural characteristics of the tube (e.g., a curvature of the tube).

Moreover, according to the exemplary embodiment of the present disclosure, the distance H between the fuel cell stack 20 and the humidifier 100 may be minimized, such that the humidifier 100 may be mounted directly on the system frame (the system frame on which the fuel cell stack 20 is seated) without additionally using a separate bracket, and as a result, it is possible to obtain an advantageous effect of reducing manufacturing costs and a weight.

According to the exemplary embodiment of the present disclosure as described above, it is possible to obtain an advantageous effect of simplifying the structure and improving the degree of design freedom and spatial utilization.

In particular, according to the exemplary embodiment of the present disclosure, the straight tube may be applied as the tube for connecting the fuel cell stack and the humidifier, and as a result, it is possible to obtain an advantageous effect of minimizing the space between the humidifier and the fuel cell stack.

In addition, according to the exemplary embodiment of the present disclosure, it is possible to obtain an advantageous effect of simplifying the manufacturing process and reducing costs.

In addition, according to the exemplary embodiment of the present disclosure, the humidifier may be mounted, without a separate bracket, directly on the system frame on which the fuel cell stack is seated.

In addition, according to the exemplary embodiment of the present disclosure, it is possible to obtain an advantageous effect of improving humidification performance and improving performance and operational efficiency of the fuel cell stack.

While the exemplary embodiments have been described above, but the exemplary embodiments are just illustrative and not intended to limit the present disclosure. It can be appreciated by those skilled in the art that various modifications and alterations, which are not described above, may be made to the present exemplary embodiment without departing from the intrinsic features of the present exemplary embodiment. For example, the respective constituent elements specifically described in the exemplary embodiments may be modified and then carried out. Further, it should be interpreted that the differences related to the modifications and alterations are included in the scope of the present disclosure defined by the appended claims.

What is claimed is:

1. A humidifier for a fuel cell, the humidifier comprising:
a housing;
a first space provided in the housing;
a moist air supply port connected to the housing so as to communicate with the first space and configured to supply moist air discharged from a fuel cell stack;
a humidification unit provided in the first space;
a second space disposed separately from the first space and provided in the housing so as to communicate with the humidification unit;
a partition part configured to divide an internal space of the housing into the first space and the second space; and
an inflow gas discharge port connected to the housing so as to communicate with the second space and configured to discharge inflow gas that has passed through the humidification unit,
wherein the partition part comprises:
a first partition wall configured to divide the internal space of the housing in a first direction; and
a second partition wall connected to the first partition wall and configured to divide the internal space of the housing in a second direction that intersects the first direction,
wherein the second space is separated from the first space by the first partition wall and the second partition wall,
wherein the first space comprises:
a first stage space portion separated from the second space with the first partition wall interposed therebetween; and
a second stage space portion configured to communicate with the first stage space portion and separated from the second space with the second partition wall interposed therebetween,
wherein the inflow gas discharge port is connected to the second partition wall so as to pass through the second stage space portion, and the moist air supply port is connected to the housing so as to face the second partition wall, and
wherein the inflow gas discharge port penetrates the second stage space portion along a direction perpendicular to a longitudinal direction of the housing in a state in which the inflow gas discharge port is sealed from the first space.

2. The humidifier of claim 1, wherein a first end of the inflow gas discharge port is exposed to an outside of the housing, and a second end of the inflow gas discharge port is connected to the partition part so as to pass through the first space and communicate with the second space.

3. The humidifier of claim 1, wherein the humidification unit is provided in the first stage space portion, and the moist air is supplied to the first stage space portion via the second stage space portion.

4. The humidifier of claim 1, wherein the housing comprises:
a housing main body configured to receive the humidification unit therein;
a first housing cap connected to a first end of the housing main body; and
a second housing cap connected to a second end of the housing main body and having the moist air supply port and the inflow gas discharge port.

5. The humidifier of claim 4, comprising:
an inflow gas supply port provided in the first housing cap so as to communicate with the humidification unit.

6. The humidifier of claim 1, wherein the humidification unit comprises:
- a cartridge casing provided in the first space, the cartridge casing having, at a first side thereof, a first window through which the moist air is introduced, and the cartridge casing having, at a second side thereof, a second window through which the moist air is discharged; and
- a humidification membrane provided in the cartridge casing and configured to allow the inflow gas to flow along the humidification membrane.

7. The humidifier of claim 6, wherein the first partition wall is made of a potting material for fixing the humidification membrane in the housing.

8. The humidifier of claim 1, comprising:
- a moist air discharge port connected to the housing so as to communicate with the first space and configured to discharge the moist air.

9. The humidifier of claim 1, comprising:
- a first straight tube configured to connect the fuel cell stack and the moist air supply port; and
- a second straight tube configured to connect the fuel cell stack and the inflow gas discharge port.

10. The humidifier of claim 9, wherein the first straight tube and the second straight tube are connected to an air control valve connected to the fuel cell stack.

\* \* \* \* \*